Aug. 24, 1965 DAIJIRO MATSUI 3,202,890
VARIABLE CAPACITOR
Filed July 13, 1962

United States Patent Office 3,202,890
Patented Aug. 24, 1965

3,202,890
VARIABLE CAPACITOR
Daijiro Matsui, Ota-ku, Tokyo-to, Japan, assignor to Kabushiki Kaisha Toko Radio Coil Kenkyusho, Ota-ku, Tokyo-to, Japan, a joint-stock company of Japan
Filed July 13, 1962, Ser. No. 209,585
Claims priority, application Japan, Dec. 20, 1961, 36/46,296
2 Claims. (Cl. 317—249)

This invention relates to electrical variable capacitors of the type comprising a rotor and a stator, and more particularly it relates to a new miniature variable capacitor of this type of high performance for two-band use or for FM-AM broadcasting use.

Briefly described, the variable capacitor of this invention comprises, in coaxial combination, with a common rotor shaft, two variable capacitor sets each of which consists of electrodes adapted to face each other through a highly dielectric sheet (hereinafter simply called ceramic sheet) such as, for example, a ceramic material, interposed between the said electrodes, one of which is adapted to be the stator electrode, and the other of which is adapted to be the rotor electrode and is fixed to the said rotor shaft, whereby the area of confrontation of the two electrodes can be varied.

It is an object of the present invention to provide a new and improved miniature variable capacitor of the construction mentioned above, in which certain necessary requirements for capacitors of this type as will be presently described are easily fulfilled.

The details of the invention as well as the manner in which its objects and advantages may best be achieved will be more clearly apparent from the following description and the accompanying illustrative drawings, in which like parts are designated by the reference numerals or letters, and in which.

Figure 1:
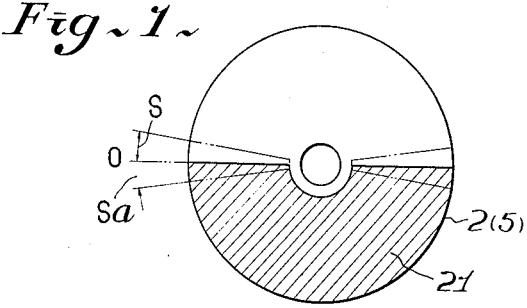
FIG. 1 is a view in the axial direction of a rotor electrode, presented for a description of the functional effect of the invention.

In general, the rotating shaft of a variable capacitor composed of a rotor and a stator is limited in rotational range to 180 degrees of angle. However, it is a necessary requirement that, within this rotational range, the area of confrontation of the rotor electrode fixed to the rotating shaft and the stator electrode confronting the rotor electrode vary through the greatest range from its maximum value. That is, it is necessary that this area of confrontation be a maximum when the rotating shaft is in its position at the beginning of this rotational range and that it be a minimum when the said shaft is in its position at the end of the said rotational range. Otherwise, for example, if the angle at which the rotor is set on the rotating shaft is in error with respect to the standard position O by an angle S or Sa, as indicated in FIG. 1, such inconvenience as the aforesaid area of confrontation of the electrodes becoming a minimum or a maximum at some intermediate point within the rotational range of the rotor will be caused.

Figure 2:
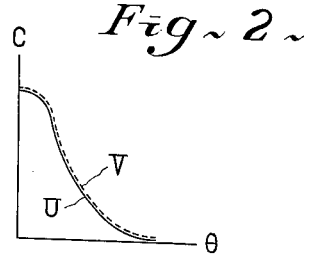
FIG. 2 is a graphical representation showing the relationship between capacitance and rotor shaft angle, presented for a description of the functional effect of the invention.

Furthermore, in such cases wherein two variable capacitors are provided with a common rotor shaft and are to be utilized particularly for two-band use, it is an important condition that the values of electrostatic capacitance C between the two pairs of opposed electrodes with respect to the angle of rotation θ of the common shaft, as shown in FIG. 2, be equal. That is, it is an important requirement that adjustment be made so that the capacitance curve U of the first capacitor coincides with the capacitance curve V of the second capacitor.

It is an object of the present invention to provide a variable capacitor of miniature size comprising two sets of opposed electrodes with a common rotor shaft in which the abovementioned two adjustments, namely, the adjustment of the rotors relative to the angle of rotation of the rotor shaft and the adjustment for effecting coincidence of the capacitance curves of the two sets of opposed electrodes, can be easily accomplished.

The above object can be achieved, in general terms, by adapting at least one of the rotors of the two sets of opposed rotors and stators provided with a common rotor shaft to be fixable to the rotor shaft in a freely adjustable manner thereto in the rotational direction and, furthermore, by fixing the said stators to an intermediate adjusting cylinder against movement in the rotational direction of the rotors and adapting the said intermediate adjusting cylinder to be fixable to a frame structure, for limiting the rotational range of the said rotor shaft, in a freely adjustable manner thereto in the rotational direction.

The details of the variable capacitor according to the invention will now be described with reference to FIGS. 3 and 4.

A first capacitor set consisting of a rotor 2 and a stator 3 in mutually opposed relation and a second capacitor set consisting of a stator 4 and a rotor 5 in mutually opposed relation are provided with a common rotor shaft 1 passed therethrough. The rotors 2 and 5 are both fixed to the rotor shaft 1, and at least one of these rotors, for example, the rotor 5, is so adapted, as will be described hereinbelow, that it is attachable to the rotor shaft 1 in a freely adjustable manner with respect thereto.

That is, in the embodiment illustrated, the back surface of the rotor 5 is provided with a plurality of depression holes 6 into which the bent tips of the arms of a retaining member 7, which is rigidly fixed to the rotor shaft 1, are inserted. These inserted bent tips have a certain degree of freedom within the range afforded by the holes 6. Accordingly, it is possible to adjust the position of the rotor 5 with respect to the rotor shaft 1 by utilizing adjustment holes 8 of the rotor. Then, by filling the holes 6 with a hardening cement material 9 after adjustment, the rotor 5 can be fixed relative to the rotor shaft 1.

The stators 3 and 4 are provided on their peripheries with projections 10, which are fitted into slotted grooves 12 formed on the inner surface of an intermediate adjusting cylinder 11, parallel to the axis thereof. Thus, the stators 3 and 4 are locked relative to the intermediate adjusting cylinder 11 in the direction of rotation of the rotors but are free in the axial direction.

The intermediate adjusting cylinder 11 is in turn provided with projections 13 which, prior to adjustment, fit loosely in grooves 15, of greater width than the said projections 13, in a frame structure 14. That is although its projections 13 are fitted into the grooves 15 in the frame structure 14, the intermediate adjusting cylinder 11 is initially capable of being adjusted to a certain extent with respect to the frame structure 14. After adjustment, a hardening cement material is poured into the spaces between the projections 13 and their respective grooves 15, whereby the cylinder 11 becomes fixed in its adjusted position.

The rotor shaft 1 is provided with a projecting lug 18 which is fitted in a rotationally slidable manner between limits in a depression in the frame structure 14, the said limits limiting the rotational range of the rotor shaft 1 to 180 degrees of angle.

Figure 3:
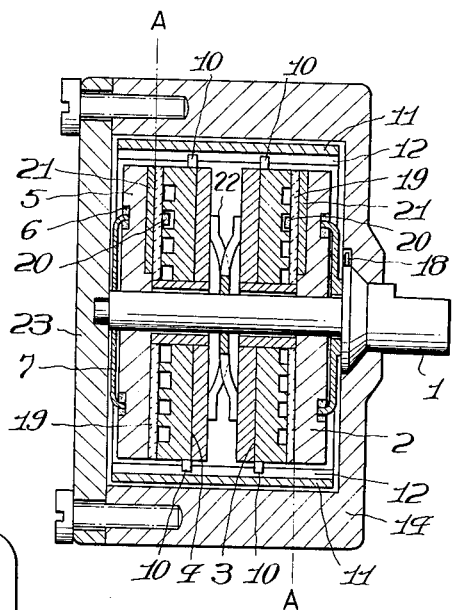
FIG. 3 is a sectional view, taken along the path III—III indicated in FIG. 4, showing one embodiment of the variable capacitor according to the present invention.
Figure 4:
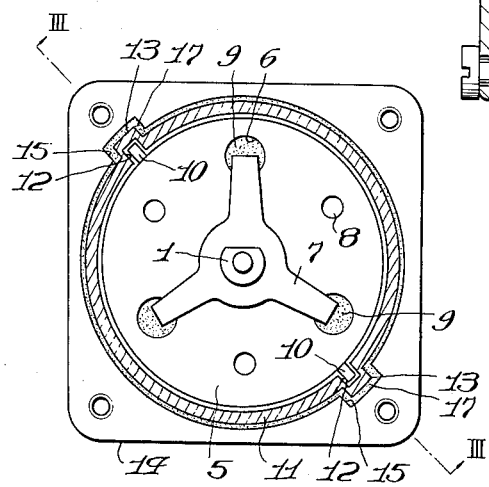
FIG. 4 is a rear elevation of the embodiment of FIG. 3, showing its appearance when its rear cover has been removed.

Referring to FIG. 3, each of the stators 3 and 4 is provided on its operating surface with a dielectric sheet 19, of such a material as a ceramic, on the inner surface of which is printed a stator electrode 20. Each of the rotors 2 and 5 is provided on its operating surface with a rotor electrode 21. The stators 3 and 4 are maintained in intimate contact with their respective rotors 2 and 5 by a compression spring 22.

The aforesaid frame structure 14 is provided with a rear cover 23 fastened securely thereto to form a rigid structure. The rotor shaft 1 is supported on bearing holes formed in the frame structure 14 and the rear cover 23. The interface between each rotor-stator pair is indicated by the discontinuous line AA.

In order to indicate still more fully the details of the invention, one example of adjustment in connection with the above-described embodiment is set forth below.

First, the rotor 2, after having been positioned beforehand in approximate position on the rotor shaft 1, is held in place, and the stators 3 and 4 and the rotor 5 are fitted on together with the spring 22, and the retaining member 7 of the rotor 5 is fixed to the rotor shaft 1. (However, the rotor 5 is still in a state wherein it is capable of being adjusted with respect to the retaining member 7, that is, with respect to the shaft 1.)

Next, the projections 10 of the stators 3 and 4 are fitted into the grooves 12 of the intermediate adjusting cylinder 11, then the projections 13 of the intermediate adjusting cylinder 11 are fitted into the grooves 15 of the frame structure 14.

Here, the rotational range of the rotor shaft 1 and the rotor 2 with respect to the frame structure 14 is limited. However, since the grooves 15 are somewhat wider than the projections 13, the intermediate adjusting cylinder 11 and the stators 3 and 4, which are fixed thereto relative to the rotational direction of the rotor, still retain a certain degree of freedom with respect to the rotor shaft 1 and the rotor 2. Accordingly, by rotating the intermediate adjusting cylinder 11 through a certain small angle with respect to the frame structure 14, it is possible to adjust the relative relationship between the rotor 2 and the stator 3, that is, to adjust the rotor 2 with respect to the angle of rotation of the rotor shaft 1.

Subsequent to the above adjustment, a hardening cement material 17 is poured into the spaces between the projections 13 and the grooves 15, whereby the intermediate adjusting cylinder 11 becomes fixed to the frame structure 14. Consequently, both the stators 3 and 4 also become fixed.

Then, in order to attain coincidence between the capacity curve U between the opposed electrodes of the fixed first set of rotor 2 and stator 3 and the capacity curve V of the second set, the relative position of the rotor 5 of the second set with respect to the stator 4, which has already been positioned, is adjusted. After this adjustment, a hardening cement material 9 is poured into the holes 6 in the stator 5 so as to fix the position of the rotor 5 relative to the rotor shaft 1.

Although the foregoing description has been set forth with particularity to one embodiment illustrated in the drawing, it will be understood that, instead of such means as the adjustment and attachment means for the rotors with respect to the rotor shaft 1 and the adjustment means for the intermediate adjusting cylinder 11 with respect to the frame structure 14, various means other than those described herein with respect to the above embodiment can be used.

According to the present invention, as described above, in providing two variable capacitors, in combination, with a common rotor shaft, the problem of adjustment of correct positions of the rotors relative to the rotational angle of the rotor shaft and the problem of adjustment for attaining coincidence between the capacity curves of the two capacitors are solved in an extremely logical and simple manner. Accordingly, a miniature variable capacitor for two-band use (or for FM-AM broadcasting use) of high performance can be effectively obtained through this invention.

Although this invention has been described with respect to a particular embodiment thereof, it is not to be so limited as changes and modifications may be made therein which are within the full intended scope of the invention, as defined by the appended claims.

What is claimed is:

1. A variable capacitor comprising two variable capacitor sets in coaxial combination, each said set consisting of a single dielectric sheet, a stator electrode disposed thereon, and a single rotor plate of corresponding size in opposed relation to said dielectric sheet; a common rotor shaft by means of which the two rotors are rotated simultaneously; a frame housing the variable capacitor; an intermediate cylinder affixed to said frame and rotatably adjustable with respect thereto; said dielectric sheets being affixed to said cylinder in the rotational direction of said rotors; said rotors being adjustable relative to said cylinder; the double adjustment thus enabling the prevention of tracking errors of both said sets.

2. A variable capacitor comprising two variable capacitor sets in coaxial combination, each set consisting of a rotor electrode and a stator electrode in mutually opposed relation; a common rotor shaft by means of which the two rotor electrodes are rotated simultaneously, at least one of said rotor electrodes being adapted to be fixable to said rotor shaft in an initially adjustable manner in the rotational direction relative thereto; a frame housing the variable capacitor; an intermediate cylinder affixed to said frame and rotatably adjustable with respect thereto; said stator electrodes being affixed to said cylinder in the rotational direction of said rotors; said rotor electrodes being adjustable relative to said cylinder; the double adjustment thus enabling the prevention of tracking errors of both said sets.

References Cited by the Examiner

UNITED STATES PATENTS 2,535,367  12/50  Minnium _____ 317—249
2,913,645  11/59  Hansen et al. _____ 317—249

FOREIGN PATENTS 1,074,156  1/60  Germany.
726,958  3/55  Great Britain.

JOHN F. BURNS, *Primary Examiner.*

JOHN P. WILDMAN, *Examiner.*